(12) United States Patent  
Farah et al.

(10) Patent No.: US 9,194,252 B2  
(45) Date of Patent: Nov. 24, 2015

(54) TURBINE FRAME FAIRING FOR A GAS TURBINE ENGINE

(75) Inventors: Jorge I. Farah, Hartford, CT (US); Theodore W. Kapustka, Glastonbury, CT (US); Jonathan P. Burt, Sturbridge, MA (US); Jonathan J. Jakiel, Vernon, CT (US); Dana P. Stewart, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 946 days.

(21) Appl. No.: 13/403,407

(22) Filed: Feb. 23, 2012

(65) Prior Publication Data

US 2013/0224010 A1  Aug. 29, 2013

(51) Int. Cl.  
*F01D 25/24* (2006.01)  
*F01D 9/04* (2006.01)  
*F01D 25/16* (2006.01)  
*B23K 1/00* (2006.01)

(52) U.S. Cl.  
CPC ............ *F01D 25/162* (2013.01); *B23K 1/0018* (2013.01); *F01D 9/04* (2013.01); *F01D 25/246* (2013.01); *B23K 2201/001* (2013.01); *F05D 2230/237* (2013.01)

(58) Field of Classification Search  
CPC ............ F01D 9/00; F01D 9/02; F01D 9/041; F01D 9/042; F01D 9/044; F01D 25/24; F01D 25/246; F01D 9/04; F01D 25/162; F05D 2230/237; F05D 2240/128; F05D 2240/14; F05D 2260/941  
See application file for complete search history.

(56) References Cited

U.S. PATENT DOCUMENTS

| | | | |
|---|---|---|---|
| 3,313,604 A | 4/1967 | Crouch | |
| 4,464,094 A | 8/1984 | Gerken | |
| 4,650,110 A | 3/1987 | Cheng | |
| 4,728,258 A | 3/1988 | Blazek et al. | |
| 4,979,872 A * | 12/1990 | Myers et al. | 415/142 |
| 5,108,261 A | 4/1992 | Ress, Jr. et al. | |
| 5,484,096 A | 1/1996 | Tank | |
| 6,330,304 B1 | 12/2001 | Warburton | |
| 6,769,162 B1 | 8/2004 | Barich et al. | |
| 6,918,594 B2 | 7/2005 | Sund et al. | |
| 7,748,956 B2 | 7/2010 | Paulino et al. | |
| 7,942,002 B2 | 5/2011 | Fish | |
| 2004/0223846 A1 * | 11/2004 | Taylor et al. | 415/200 |
| 2006/0171812 A1 | 8/2006 | Albrecht et al. | |
| 2007/0068136 A1 * | 3/2007 | Cameriano et al. | 60/200.1 |
| 2010/0086401 A1 * | 4/2010 | Davey | 415/209.3 |

FOREIGN PATENT DOCUMENTS

GB         724691         2/1955

OTHER PUBLICATIONS

International Search Report and Written Opinion for International Application No. PCT/US2013/026969 completed on Jun. 20, 2013.  
International Preliminary Search Report on Patentability for PCT Application No. PCT/US2013/026969 mailed Sep. 4, 2014.

* cited by examiner

*Primary Examiner* — Edward Look  
*Assistant Examiner* — Christopher R Legendre  
(74) *Attorney, Agent, or Firm* — Carlson, Gaskey & Olds, P.C.

(57) ABSTRACT

A static structure of a gas turbine engine includes a multiple of airfoil segments and at least one structural reinforcement ring mounted to the multiple of airfoil segments.

17 Claims, 8 Drawing Sheets

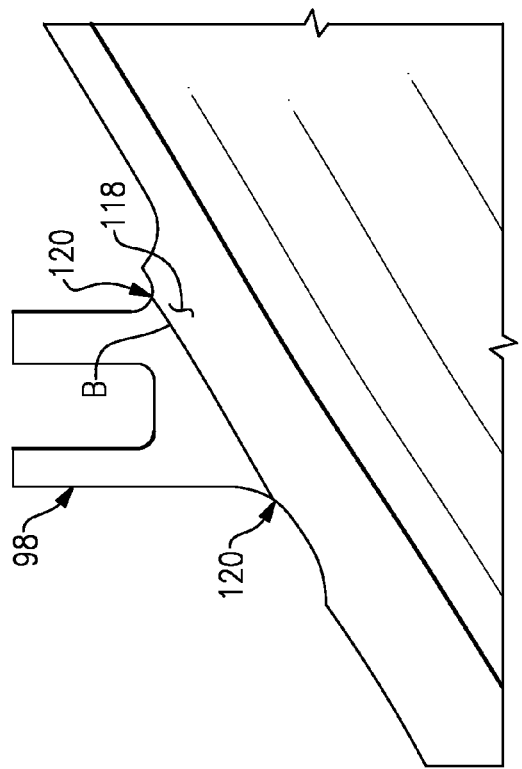
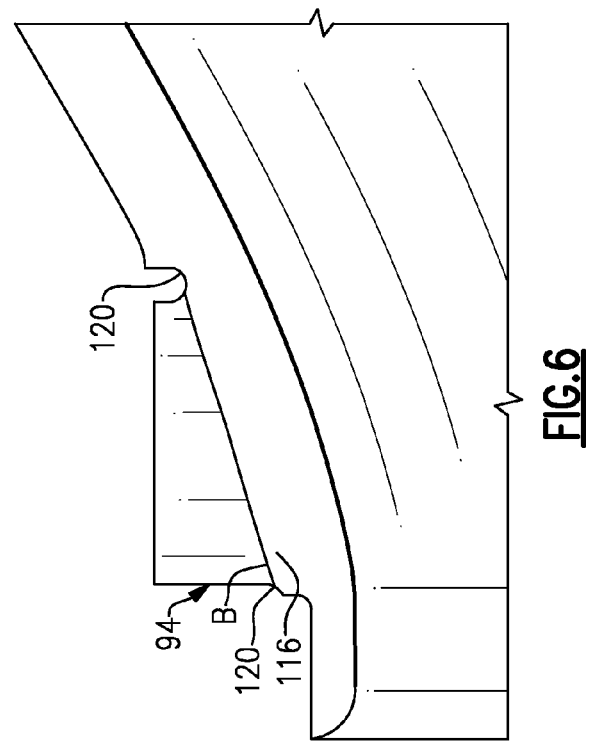

TURBINE FRAME FAIRING FOR A GAS TURBINE ENGINE

BACKGROUND

The present disclosure relates to a gas turbine engine, and more particularly to static structure thereof.

In a turbine section of a gas turbine engine, a support structure typically extend between an annular outer case and an annular inner case across a core path through which hot core exhaust gases are communicated. The support structure is often shielded by a respective high temperature resistant cast metal alloy aerodynamically shaped fairing that forms the flowpath. For applications where this structure is located between the high-pressure turbine and low-pressure turbine it is referred to as a mid-turbine frame.

The mid-turbine frame fairings are typically not conducive to welding, and large-scale castings may be relatively expensive to manufacture. The mid-turbine frame fairings often employ single or double vane segments which are attached directly to the cold structure annular outer case or are mechanically joined to each other to form a full ring structure which is then attached to the cold structure. The segmented structure may require vane platform-to-platform sealing as well as sealing to the adjoining aero structures. Segmented structures may be subject to non-uniform deflections driven by thermal and pressure environment within the turbine section and may exhibit "shingling" between adjacent segments that may potentially result in leakage.

SUMMARY

A static structure of a gas turbine engine according to an exemplary aspect of the present disclosure includes a multiple of airfoil segments and at least one structural reinforcement ring mounted to the multiple of airfoil segments.

In a further non-limiting embodiment of the foregoing example, the static structure is a mid-turbine frame fairing for a gas turbine engine.

In a further non-limiting embodiment of any of the foregoing examples, each of the multiple of airfoil segments includes a hollow airfoil.

In a further non-limiting embodiment of any of the foregoing examples, the at least one structural reinforcement ring is mounted to an outer surface of said multiple of airfoil segments.

In a further non-limiting embodiment of any of the foregoing examples, the at least one structural reinforcement ring is mounted to an inner surface of said multiple of airfoil segments.

In a further non-limiting embodiment of any of the foregoing examples, the at least one structural reinforcement ring is mounted to the multiple of airfoil segments on a conical surface.

In a further non-limiting embodiment of any of the foregoing examples, the at least one structural reinforcement ring is brazed to the multiple of airfoil segments with a first braze and each of the multiple of airfoil segments are brazed to an adjacent one of the multiple airfoil segments with a second braze, the first braze different than the second braze.

In a further non-limiting embodiment of any of the foregoing examples, each of the multiple of airfoil segments are brazed to an adjacent one of the multiple airfoil segments along a respective butt joint, each of the respective butt joints clocked with respect to the axis.

A further non-limiting embodiment of any of the foregoing examples includes a multiple of shear plates, each of the multiple of shear plates bridges two airfoil segments of the multiple of airfoil segments.

In a further non-limiting embodiment of any of the foregoing examples, the at least one structural reinforcement ring includes an outer structural reinforcement ring mounted to an outer surface of the multiple of airfoil segments and an inner structural reinforcement ring mounted to an inner surface of the multiple of airfoil segments, the outer structural reinforcement ring being thicker than the inner structural reinforcement ring.

A further non-limiting embodiment of any of the foregoing examples includes a multiple of shear plates, each of the multiple of shear plates bridges two airfoil segments of the multiple of airfoil segments.

A further non-limiting embodiment of any of the foregoing examples includes a relief cut between the at least one structural reinforcement ring and the multiple of airfoil segments.

In a further non-limiting embodiment of any of the foregoing examples, the relief cut is defined around the circumference of said multiple of airfoil segments.

A mid-turbine frame fairing for a gas turbine engine according to an exemplary aspect of the present disclosure includes a multiple of airfoil segments, an outer structural reinforcement ring mounted to an outer taper of the multiple of airfoil segments, and an inner structural reinforcement ring mounted to an inner taper of the multiple of airfoil segments.

In a further non-limiting embodiment of any of the foregoing examples, the outer structural reinforcement ring and the inner structural reinforcement ring are brazed to the multiple of airfoil segments with a first braze and each of the multiple of airfoil segments are brazed to an adjacent one of the multiple of airfoil segments with a second braze, the first braze different than the second braze.

In a further non-limiting embodiment of any of the foregoing examples, the outer structural reinforcement ring is mounted to an outer platform of the multiple of airfoil segments and the inner structural reinforcement ring is mounted to an inner platform of the multiple of airfoil segments, the outer structural reinforcement ring being thicker than the inner structural reinforcement ring.

In a further non-limiting embodiment of any of the foregoing examples, the outer structural reinforcement ring is radially outboard of the inner structural reinforcement ring.

A further non-limiting embodiment of any of the foregoing examples includes a multiple of shear plates, each of the multiple of shear plates bridges two airfoil segments of the multiple of airfoil segments.

A method of assembling a mid-turbine frame fairing for a gas turbine engine according to an exemplary aspect of the present disclosure includes brazing a multiple of airfoil segments together to form an annular core flow path about an axis and brazing a structural reinforcement ring to the multiple of airfoil segments.

A further non-limiting embodiment of any of the foregoing examples includes brazing the structural reinforcement ring to the multiple of airfoil segments at a taper.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 6 is an expanded sectional view of a forward outer structural reinforcement ring of the mid-turbine frame fairing;

FIG. 7 is an expanded sectional view of an aft outer structural reinforcement ring of the mid-turbine frame fairing;

DETAILED DESCRIPTION

Figure 1:
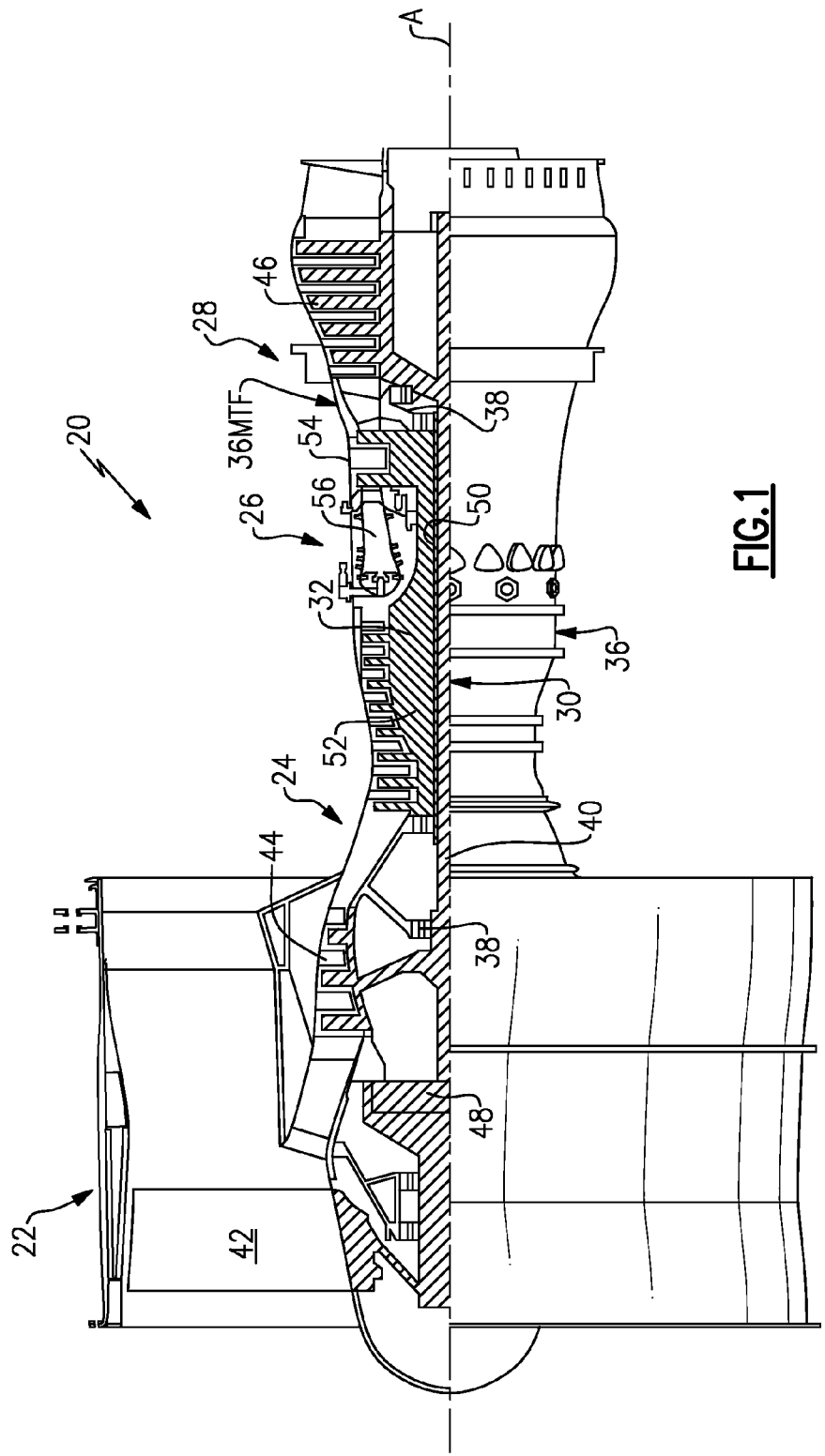
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath and core flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 54, 46 rotationally drive the respective low speed spool 30 and high speed spool 32 in response to the expansion.

Figure 2:
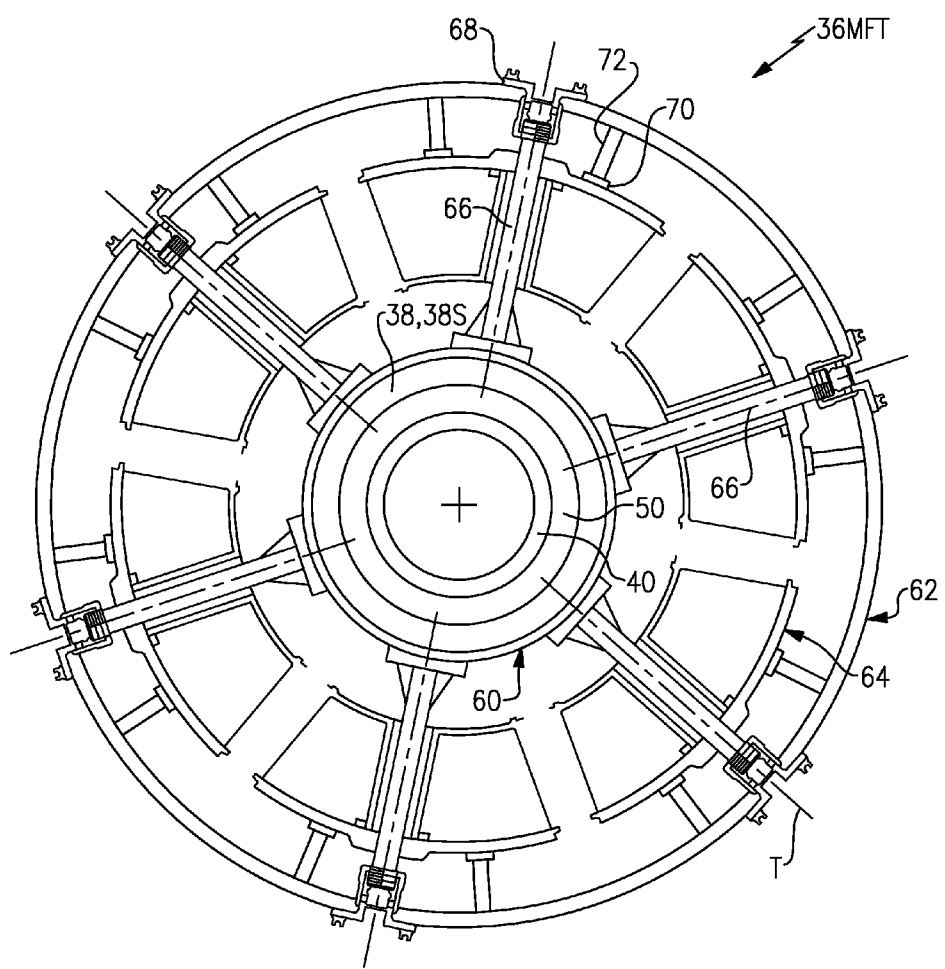
FIG. 2 is a front sectional view of the mid-turbine frame.

With reference to FIG. 2, the turbine section 28 generally includes a static structure 36 mid-turbine frame which is disclosed herein as a mid-turbine section of the gas turbine engine 20. It should be appreciated that various other static structures such as a turbine exhaust case, between a low pressure turbine and a power turbine, or other turbine frame static structures will also benefit herefrom.

The static structure 36 mid-turbine frame includes an annular inner turbine exhaust case 60, an annular outer turbine exhaust case 62, a mid-turbine frame fairing 64 (also shown separately in FIG. 3), a multiple of support tie rods 66, a respective multiple of tie rod fasteners 68 and a multiple of pin bosses 70 which receive pins 72 which extend radially inward from the outer turbine exhaust case 62. The annular inner turbine exhaust case 60 typically supports a bearing system 38 as well as other components such as seal cartridge structures 38S within which the inner and outer shafts 40, 50 rotate.

The support tie rods 66 are utilized to at least partially mount the mid-turbine frame fairing 64 within the annular inner turbine exhaust case 60 and the annular outer turbine exhaust case 62. Each of the support tie rods 66 may be fastened to the annular outer turbine exhaust case 62 through the multiple of fasteners 68 such that the annular inner turbine exhaust case 60 is spaced relative thereto. It should be understood that various attachment arrangements may alternatively or additionally be utilized.

Figure 3:
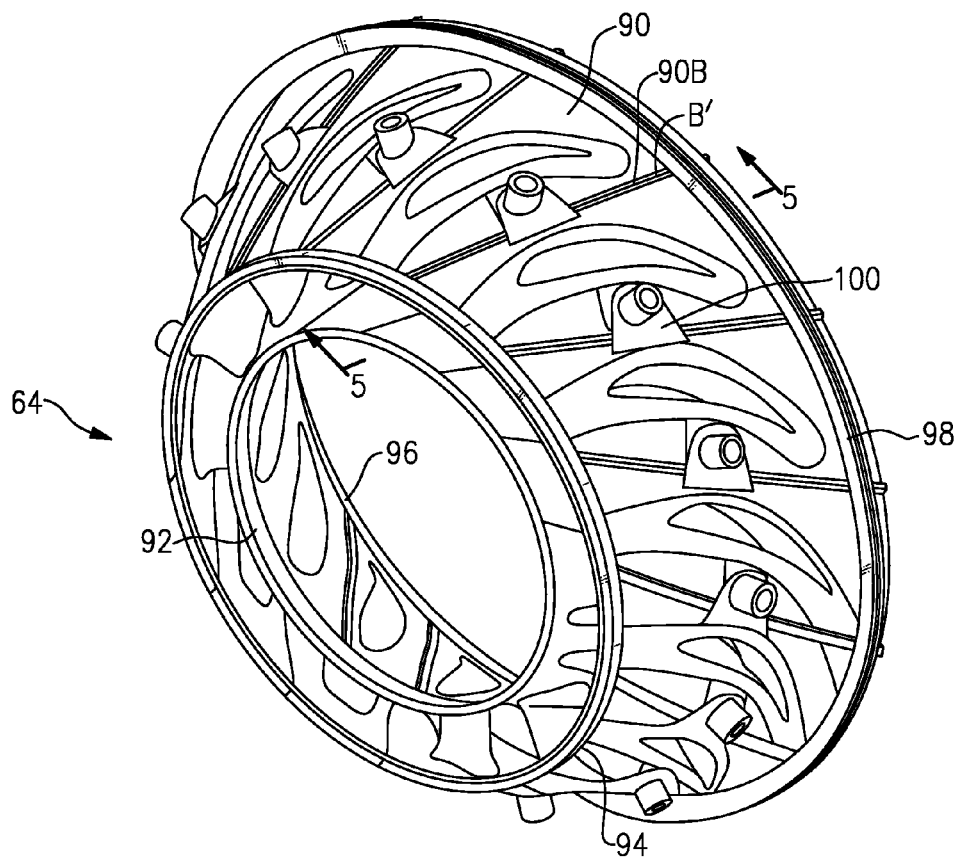
FIG. 3 is an enlarged perspective view of the mid-turbine frame fairing.

With reference to FIG. 3, the mid-turbine frame fairing 64 generally includes a multiple of airfoil segments 90 (also shown separately in FIG. 4), a forward inner structural reinforcement ring 92, a forward outer structural reinforcement ring 94, an aft inner structural reinforcement ring 96, and aft outer structural reinforcement ring 98, and a multiple of shear plates 100. Generally, the forward inner structural reinforcement ring 92, the forward outer structural reinforcement ring 94, the aft inner structural reinforcement ring 96, the aft outer structural reinforcement ring 98 and the multiple of shear plates 100 carry tensile stresses. The architecture provides a full ring homogenous fairing structure.

Figure 4:
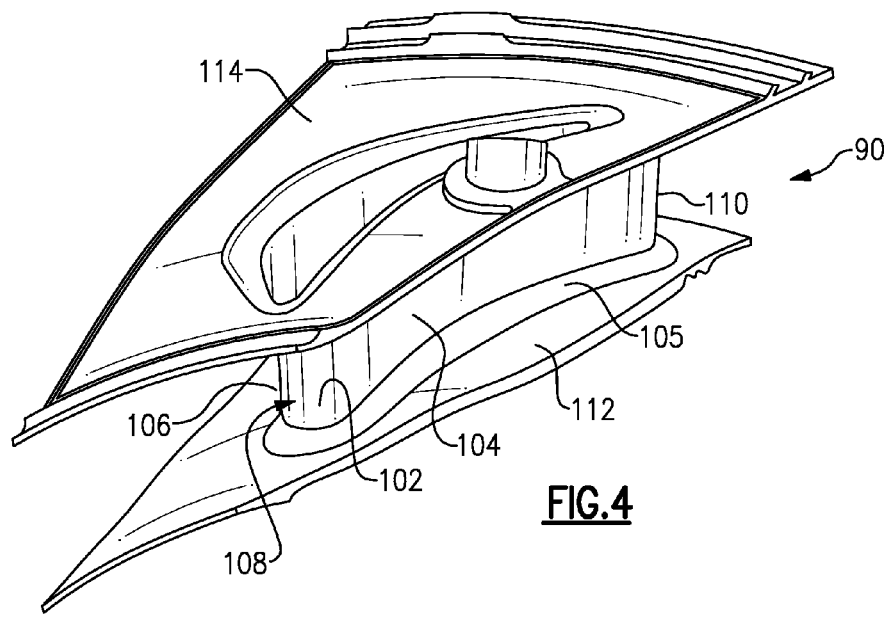
FIG. 4 is an enlarged perspective view of a single segment of the mid-turbine frame fairing.

Each airfoil segment 90 generally includes a hollow airfoil portion 102 with a generally concave shaped portion which forms a pressure side 104 and a generally convex shaped portion which forms a suction side 106 between a leading edge 108 and a trailing edge 110 (FIG. 4). Each airfoil portion 102 may include a fillet 105 to provide a transition between the respective airfoil portion 102, an inner platform 112 and an outer platform 114 (FIG. 4). It should be appreciated that although an airfoil singlet with a single airfoil portion 102 is illustrated, it should be appreciated that other segments with other numbers of airfoils, such as a doublet will also benefit herefrom.

The multiple of airfoil segments 90 are assembled to form an annular ring about the axis A to define a portion of the annular core flow path for a core airflow radially between the inner platform 112 and the outer platform 114 along the multiple of airfoil segments 90. The mid-turbine frame fairing 64 is located axially between the high pressure turbine 54 and the low pressure turbine 46. The multiple of airfoil segments 90 are assembled to each other along butt joints 90B between the respective inner platform 112 and the outer platform 114. The butt joints 90B, in one disclosed non-limiting embodiment, may be clocked with respect to the axis A. That is, the butt joints 90B are not parallel to the axis A.

The multiple of airfoil segments 90 may be manufactured of a cast Nickel alloy while the forward inner structural reinforcement ring 92, the forward outer structural reinforcement ring 94, the aft inner structural reinforcement ring 96, and the aft outer structural reinforcement ring 98 may be manufactured of cast or wrought high-temperature alloys. It should be understood that various other materials may be utilized and may be specifically selected to match the coefficient of thermal expansion. A braze B' may be further specifically tailored for attachment along the butt joints 90B to, for example, primarily facilitate gap fill properties, while a braze B selected for the forward inner structural reinforcement ring 92, the forward outer structural reinforcement ring 94, the aft inner structural reinforcement ring 96, the aft outer structural reinforcement ring 98 and the multiple of shear plates 100 may be specifically tailored to primarily facilitate, for example, strength to resist hoop stresses.

Figure 5:
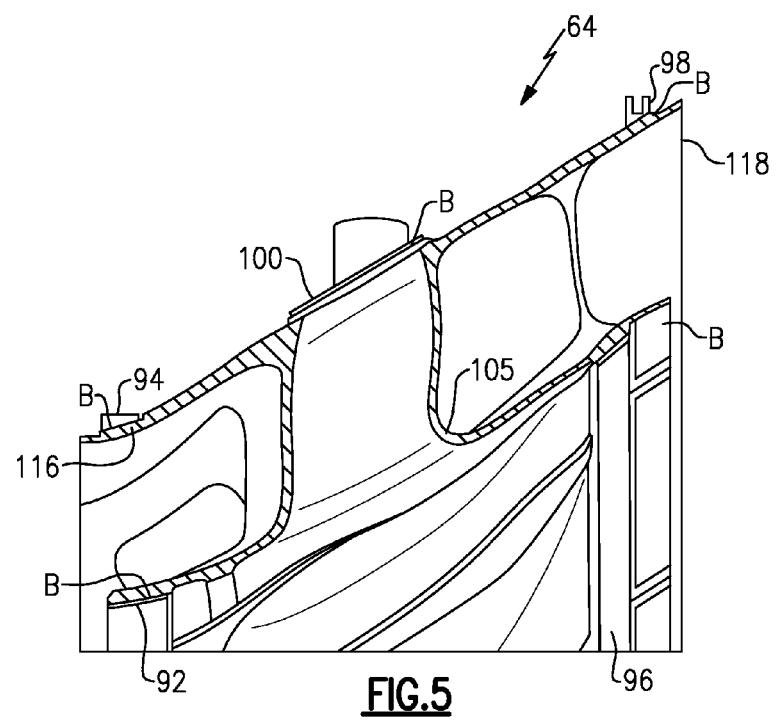
FIG. 5 is a sectional view of the mid-turbine frame fairing taken along line 5-5 in FIG. 3.

With reference to FIG. 5, the forward outer structural reinforcement ring 94 and the aft outer structural reinforcement ring 98 are located on a respective low profile forward outer taper 116 (FIG. 6), and aft outer taper 118 (FIG. 7) which are generally located in highly loaded regions of the mid-turbine frame fairing 64 to accommodate hoop loads thereon. The forward outer taper 116 and the aft outer taper 118 define a conical surface with respect to the axis A to facilitate control of the braze gap.

The forward outer structural reinforcement ring 94 and the aft outer structural reinforcement ring 98 are relatively thick, to carry hoop load from thermal stress of the full ring homogenous fairing structure, while the forward outer taper 116 and the aft outer taper 118 are relatively thin to minimize thermal stresses and tension stresses at the brazed butt-joints B' (segment-to-segment), on the forward outer structural reinforcement ring 94 and the aft outer structural reinforcement ring 98 while providing a compressive load as the mid-turbine frame fairing 64 expands in response to the core airflow there through.

The braze joint interface B between the respective forward outer structural reinforcement ring 94 and the forward outer taper 116 (FIG. 6) as well as the aft outer structural reinforcement ring 98 and the aft outer taper 118 (FIG. 7) may include relief cuts 120 to reduce stress concentrations. The relief cuts may extend about the outer circumference of the mid-turbine frame fairing 64.

Figure 9:
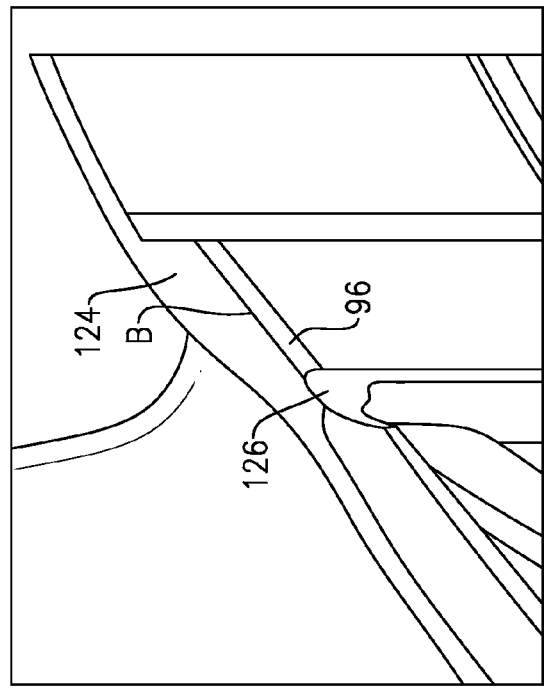
FIG. 9 is an expanded sectional view of an aft inner structural reinforcement ring of the mid-turbine frame fairing.
Figure 8:
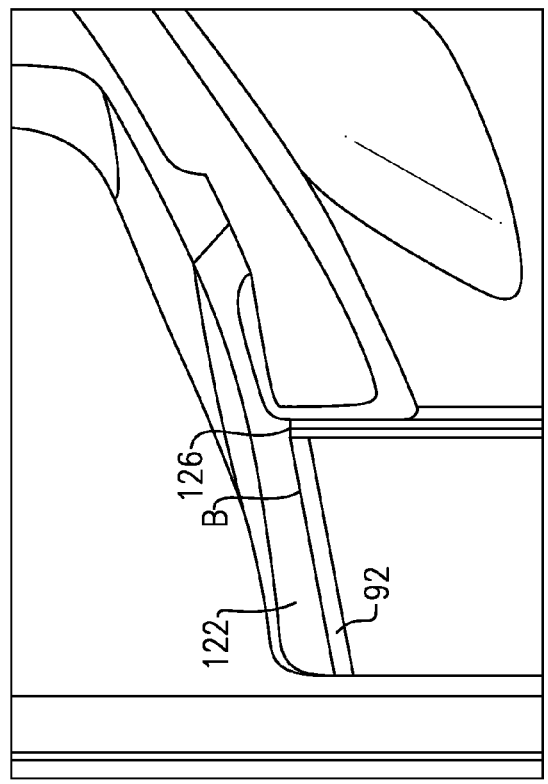
FIG. 8 is an expanded sectional view of a forward inner structural reinforcement ring of the mid-turbine frame fairing.

The forward inner structural reinforcement ring 92 and the aft inner structural reinforcement ring 96 are located on a respective low profile forward inner taper 122 (FIG. 8), and the aft inner taper 124 (FIG. 9). The forward inner structural reinforcement ring 92 and the aft inner structural reinforcement ring 96 may be located in highly loaded regions. The forward inner taper 122 (FIG. 8) and the aft inner taper 124 also define a conical surface with respect to the axis A to facilitate control of the braze gap. In contrast to the forward outer structural reinforcement ring 94 and the aft outer structural reinforcement ring 98, the forward inner structural reinforcement ring 92 and the aft inner structural reinforcement ring 96 are relatively radially thin and in one disclosed, non-limiting embodiment may be less than approximately half the thickness of the outer structural reinforcement rings 94, 98 to minimize the thermal gradient during operation. That is, the forward inner structural reinforcement ring 92 and the aft inner structural reinforcement ring 96 are relatively thin to minimize undue stress on the mid-turbine frame fairing 64 when expanded in response to the core airflow.

The braze joint interface B between the respective forward inner structural reinforcement ring 92 and the low profile forward inner taper 122 (FIG. 7) as well as the aft inner structural reinforcement ring 96 and aft inner taper 124 (FIG. 8) may also include relief cuts 126 to reduce stress concentrations. The relief cuts may extend about the inner circumference of the mid-turbine frame fairing 64.

The forward inner structural reinforcement ring 92, the forward outer structural reinforcement ring 94, the aft inner structural reinforcement ring 96, and the aft outer structural reinforcement ring 98 provides a primary load path for the brazed butt-joint 90B segment architecture. The full ring structural reinforcement rings 92-98 divorce the platform-to-platform braze joints B' from the heretofore need to be structural joints. The hoop strength of the full ring structural reinforcement rings 92-98 also manage structural loads and thermal gradients to permit the brazed butt-joints B' (segment-to-segment) to be employed as a sealing joint rather than structural joints. The structural reinforcement rings 92-98 are also multi-use, as for example, structural members and seal interfaces as well as facilitate ground handling, in-process manufacture datums, etc.

Figure 10:
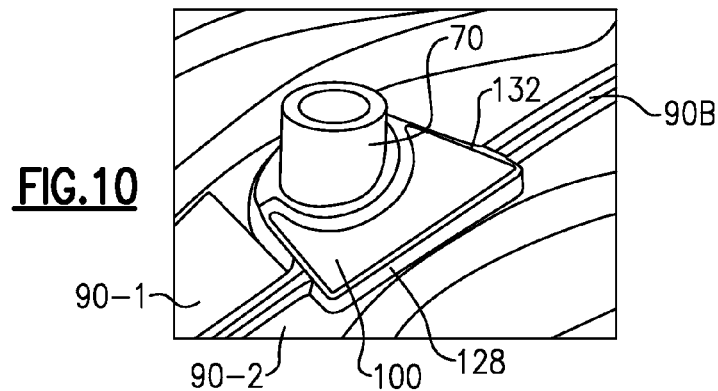
FIG. 10 is an expanded view of an shear plate of the mid-turbine frame fairing.

With reference to FIG. 10, the multiple of shear plates 100 extend across the butt joints 90B to tie together each two adjacent airfoil segments 90-1, 90-2. That is, each shear plate 100 bridges two airfoil segments 90 and may be of a relatively low profile to reduce thermal gradients. The shear plates 100 may be located approximately mid-span to at least partially surround the pin boss 70 which may be utilized at least partially to mount the mid-turbine frame fairing 64 within the engine static structure (FIG. 2). It should be appreciated that other structure such as tie-rods may alternatively or additionally be utilized.

The shear plates 100 may be brazed onto respective platforms 128 on the outer surface of airfoil segments 90. A braze joint interface B between the shear plates 100 may be brazed onto respective platforms 128 that may also include relief cuts 132 to reduce stress concentrations.

Figure 11:
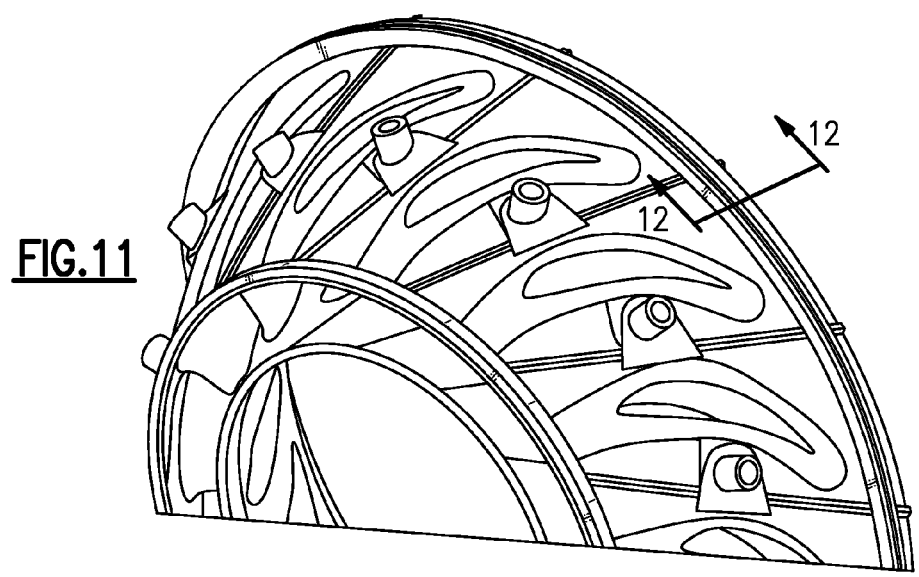
FIG. 11 is an enlarged perspective view of the mid-turbine frame fairing.
Figure 12:
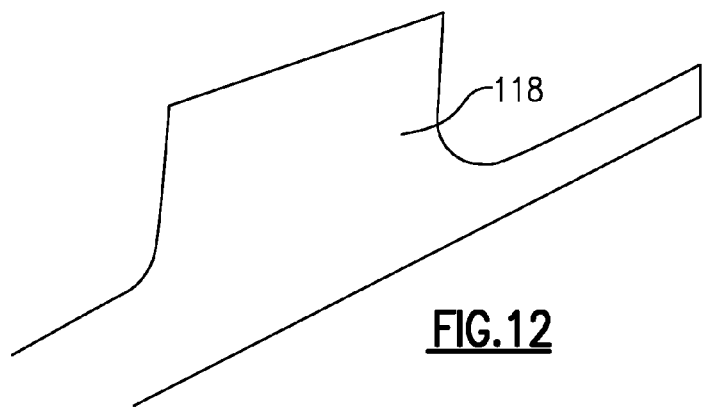
FIG. 12 is an enlarged sectional view of the aft outer structural reinforcement ring section of the mid-turbine frame fairing which is representative of each band section.
Figure 13:
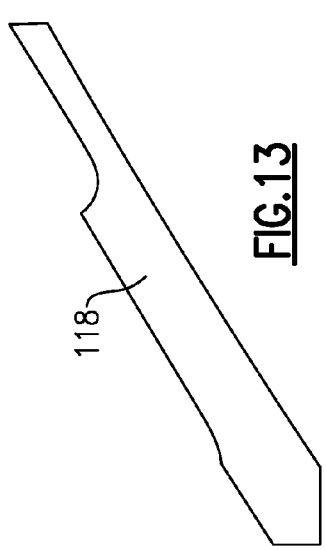
FIG. 13 is an enlarged sectional view of the aft outer structural reinforcement ring section machined to form a taper to define a desired braze gap.
Figure 14:
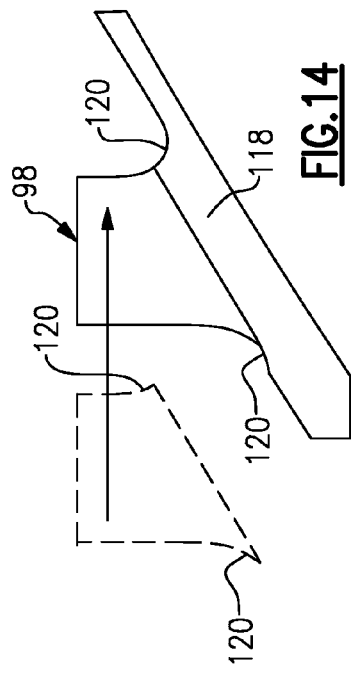
FIG. 14 is an enlarged sectional view of the aft outer structural reinforcement ring being assembled to the taper.
Figure 15:
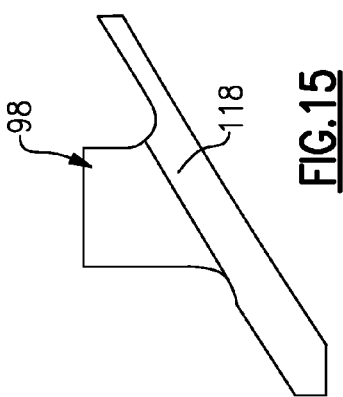
FIG. 15 is an enlarged sectional view of the aft outer structural reinforcement ring brazed to the taper.
Figure 16:
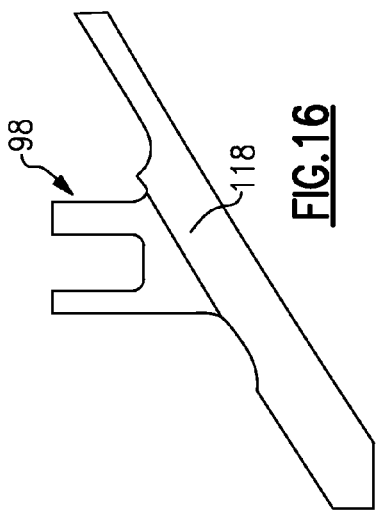
FIG. 16 is an enlarged sectional view of a machining step of the aft outer structural reinforcement ring brazed to the taper.

The tensile stresses carried by the structural reinforcement rings 92-98 and shear plates 100 provide relatively large shear areas to reduces braze stress. The structural reinforcement rings 92-98 and shear plates 100 materials may be further selected to match the CTE. For example, dependent on location and thermal gradient conditions, the brazed structural reinforcement rings 92-98 are readily tailored to stay relatively cool and provide compressive load or can be tailored to be relatively thin to minimize thermal gradient during operation In one disclosed, non-limiting embodiment of a method of assembly, the airfoil segments 90 are brazed to each other to form fairing vane pack sub-assembly of the mid-turbine frame fairing 64 (FIG. 11). The sub-assembly is then coated and heat treated. The forward outer taper 116, the aft outer taper 118 (shown as a common example in FIG. 12), the forward inner taper 122 and the aft inner taper 124 are then machined to form conical surfaces for a desired braze gap (FIG. 13). The structural reinforcement ring braze relief cuts 120 are then machined. The structural reinforcement rings 92-98 are then assembled (FIG. 14) and brazed to the vane pack (FIG. 15). Then, the final seal carrier/land geometry is machined into the structural reinforcement rings 92-98 (FIG. 16). It should be appreciated that the outer structural reinforcement rings 92, 94 are assembled from the leading edge of the mid-turbine frame fairing 64 while the inner diameter structural reinforcement rings 96, 98 are assembled from the trailing edge of the mid-turbine frame fairing 64.

The structural reinforcement rings 92-98 and shear plates 100 overcome non-uniform deflections and minimize possible segment leakage. The structural reinforcement rings 92-98 and shear plates 100 also provide robust joint strength to overcome tensile and bending loads.

It should be understood that relative positional terms such as "forward," "aft," "upper," "lower," "above," "below," and the like are with reference to the normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A mid-turbine frame fairing for a gas turbine engine comprising:
   a multiple of airfoil segments;
   an outer structural reinforcement ring mounted to an outer taper of said multiple of airfoil segments;
   an inner structural reinforcement ring mounted to an inner taper of said multiple of airfoil segments; and
   a multiple of shear plates, each of said multiple of shear plates bridges two airfoil segments of said multiple of airfoil segments.

2. The mid-turbine frame fairing as recited in claim 1, wherein said outer structural reinforcement ring is mounted to an outer platform of said multiple of airfoil segments and said inner structural reinforcement ring is mounted to an inner platform of said multiple of airfoil segments, said outer structural reinforcement ring thicker than said inner structural reinforcement ring.

3. The mid-turbine frame fairing as recited in claim 1, wherein said outer structural reinforcement ring is radially outboard of said inner structural reinforcement ring.

4. A static structure for a gas turbine engine comprising:
   a multiple of airfoil segments;
   at least one structural reinforcement ring mounted to said multiple of airfoil segments; and
   a multiple of shear plates, each of said multiple of shear plates bridges two airfoil segments of said multiple of airfoil segments.

5. The static structure as recited in claim 4, wherein said static structure is a mid-turbine frame fairing for a gas turbine engine.

6. The static structure as recited in claim 4, wherein each of said multiple of airfoil segments includes a hollow airfoil.

7. The static structure as recited in claim 4, wherein said at least one structural reinforcement ring is mounted to an outer surface of said multiple of airfoil segments.

8. The static structure as recited in claim 4, wherein said at least one structural reinforcement ring is mounted to an inner surface of said multiple of airfoil segments.

9. The static structure as recited in claim 4, wherein said at least one structural reinforcement ring is mounted to said multiple of airfoil segments on a conical surface.

10. The static structure as recited in claim 4, wherein said at least one structural reinforcement ring includes an outer structural reinforcement ring mounted to an outer surface of said multiple of airfoil segments and an inner structural reinforcement ring mounted to an inner surface of said multiple of airfoil segments, said outer structural reinforcement ring thicker than said inner structural reinforcement ring.

11. The static structure as recited in claim 4, further comprising a relief cut between said at least one structural reinforcement ring and said multiple of airfoil segments.

12. The static structure as recited in claim 11, wherein said relief cut is defined around the circumference of said multiple of airfoil segments.

13. A mid-turbine frame fairing for a gas turbine engine comprising:
   a multiple of airfoil segments:
   an outer structural reinforcement ring mounted to an outer taper of said multiple of airfoil segments; and
   an inner structural reinforcement ring mounted to an inner taper of said multiple of airfoil segments, wherein said outer structural reinforcement ring and said inner structural reinforcement ring are brazed to said multiple of airfoil segments with a first braze and each of said multiple of airfoil segments are brazed to an adjacent one of said multiple of airfoil segments with a second braze, said first braze different than said second braze.

14. A static structure for a gas turbine engine comprising:
   a multiple of airfoil segments; and
   at least one structural reinforcement ring mounted to said multiple of airfoil segments, wherein said at least one structural reinforcement ring is brazed to said multiple of airfoil segments with a first braze and each of said multiple of airfoil segments are brazed to an adjacent one of said multiple airfoil segment with a second braze, said first braze different than said second braze.

15. A static structure for a gas turbine engine comprising:
   a multiple of airfoil segments; and
   at least one structural reinforcement ring mounted to said multiple of airfoil segments, wherein each of said multiple of airfoil segments are brazed to an adjacent one of said multiple airfoil segments along a respective butt joint, each of said respective butt joints clocked with respect to the axis.

16. A method of assembling a mid-turbine frame fairing for a gas turbine engine comprising:
   brazing a multiple of airfoil segments together to form an annular core flow path about an axis, there being a multiple of shear plates bridging two airfoil segments of the multiple of airfoil segments; and
   brazing a structural reinforcement ring to the multiple of airfoil segments.

17. The method as recited in claim 16, further comprising:
   brazing the structural reinforcement ring to the multiple of airfoil segments at a taper.

* * * * *